United States Patent
Sammel et al.

(10) Patent No.: US 9,675,089 B2
(45) Date of Patent: Jun. 13, 2017

(54) METHOD AND APPARATUS TO MECHANICALLY REDUCE FOOD PRODUCTS INTO IRREGULAR SHAPES AND SIZES

(75) Inventors: Lauren Michele Sammel, Madison, WI (US); Cory Painter, Cottage Grove, WI (US); Sarah C. Humke, Madison, WI (US); Scott J. Bradley, Poynette, WI (US)

(73) Assignee: Kraft Foods Group Brands LLC, Chicago, IL (US)

( * ) Notice: Subject to any disclaimer, the term of this patent is extended or adjusted under 35 U.S.C. 154(b) by 1976 days.

(21) Appl. No.: 12/267,356

(22) Filed: Nov. 7, 2008

(65) Prior Publication Data

US 2010/0119678 A1 May 13, 2010

(51) Int. Cl.
| | |
|---|---|
| *B26D 7/06* | (2006.01) |
| *B23D 25/02* | (2006.01) |
| *B26D 3/00* | (2006.01) |
| *A22C 17/00* | (2006.01) |
| *B26D 1/02* | (2006.01) |
| *B26D 3/22* | (2006.01) |
| *B26D 1/22* | (2006.01) |
| *B26D 1/36* | (2006.01) |
| *B26D 3/28* | (2006.01) |

(52) U.S. Cl.
CPC ............ *A22C 17/0033* (2013.01); *B26D 1/02* (2013.01); *B26D 3/22* (2013.01); *B26D 7/06* (2013.01); *B26D 7/0691* (2013.01); *B26D 1/22* (2013.01); *B26D 1/36* (2013.01); *B26D 3/28* (2013.01)

(58) Field of Classification Search
CPC .... A22C 17/0033; B26D 1/36; B26D 7/0691; B26D 1/22; B26D 3/28
USPC .......................... 83/23, 37, 39, 49, 403, 408
See application file for complete search history.

(56) References Cited

U.S. PATENT DOCUMENTS

| | | | | |
|---|---|---|---|---|
| 2,232,089 A | * | 2/1941 | Wool | 83/39 |
| 2,252,733 A | * | 8/1941 | Ratchford | 225/4 |
| 3,521,688 A | * | 7/1970 | Urschel et al. | 83/165 |
| 3,857,310 A | * | 12/1974 | Tiby | 83/26 |
| 4,041,822 A | * | 8/1977 | Gabel | 83/409.2 |
| 4,484,374 A | | 11/1984 | Herschberger | |
| 4,625,606 A | * | 12/1986 | Pinegar et al. | 83/403 |
| 4,946,085 A | * | 8/1990 | Nilsson et al. | 225/3 |
| 5,022,299 A | * | 6/1991 | Fischer et al. | 83/676 |

(Continued)

OTHER PUBLICATIONS

Urschel Laboratories Incorporated; DiversaCut 2110 Dicer brochure; L1920 Aug. 2004; 4 pages.
Canadian Intellectual Property Office; Canadian Office Action for CA2683521 dated Aug. 29, 2011; 2 pages.

*Primary Examiner* — Ghassem Alie
*Assistant Examiner* — Bharat C Patel
(74) *Attorney, Agent, or Firm* — Fitch, Even, Tabin & Flannery LLP

(57) ABSTRACT

Methods and apparatus are disclosed for producing irregular slices of meat from meat products. The meat products can be rotated using an impeller having a plurality of paddles for urging the meat products against a slicing blade during rotation of the impeller in order to create a slice from the meat product. The meat products can impact the slicing blade in different orientations in order to create differently shaped, irregular slices of meat. A cutting blade downstream of the slicing blade can be used to reduce the width of the slices of meat.

7 Claims, 5 Drawing Sheets

(56) References Cited

U.S. PATENT DOCUMENTS

| | | | |
|---|---|---|---|
| 5,129,299 A * | 7/1992 | Fischer et al. | 83/356.3 |
| 5,249,494 A * | 10/1993 | Borvitz | 83/302 |
| 5,340,354 A | 8/1994 | Anderson et al. | |
| 5,343,623 A | 9/1994 | Cole et al. | |
| 5,694,824 A * | 12/1997 | Jacko et al. | 83/403 |
| 5,896,801 A | 4/1999 | Jacko | |
| 5,927,175 A * | 7/1999 | Franks et al. | 83/883 |
| 5,992,284 A | 11/1999 | Bucks | |
| 6,148,702 A | 11/2000 | Bucks | |
| 6,314,849 B1 * | 11/2001 | Arrasmith | 83/145 |
| 6,460,444 B2 | 10/2002 | Jacko | |
| 6,561,067 B2 * | 5/2003 | Arrasmith | 83/145 |
| 6,792,841 B2 | 9/2004 | Bucks | |
| 6,883,411 B2 * | 4/2005 | Arrasmith et al. | 83/403 |
| 6,895,846 B2 * | 5/2005 | Walker et al. | 83/403 |
| 6,920,813 B2 | 7/2005 | Bucks | |
| 6,952,989 B2 | 10/2005 | Bucks et al. | |
| 7,000,518 B2 | 2/2006 | Bucks et al. | |
| 7,178,440 B2 | 2/2007 | Bucks | |
| 7,263,923 B2 | 9/2007 | Urschel et al. | |
| 2002/0170991 A1 * | 11/2002 | Prewitt et al. | 241/89.3 |
| 2005/0199115 A1 | 9/2005 | Veltrop et al. | |
| 2006/0163792 A1 | 7/2006 | Bucks et al. | |
| 2006/0266175 A1 * | 11/2006 | McCormick et al. | 83/13 |
| 2007/0227325 A1 * | 10/2007 | Urschel et al. | 83/42 |
| 2007/0240550 A1 | 10/2007 | Jacko et al. | |
| 2008/0022822 A1 | 1/2008 | Jacko et al. | |
| 2008/0134850 A1 | 6/2008 | Bates et al. | |
| 2008/0190255 A1 | 8/2008 | McCracken et al. | |

* cited by examiner

METHOD AND APPARATUS TO MECHANICALLY REDUCE FOOD PRODUCTS INTO IRREGULAR SHAPES AND SIZES

FIELD

This disclosure relates generally to a method and apparatus for producing food slices of irregular shape and size.

BACKGROUND

Cutting and slicing systems for various food products like vegetables, fruits, and meat products are known. When focused on meat products, the systems in the art are typically directed to producing uniform slices and cuts. In fact, the art exhibits a systematic progression to achieve greater and greater uniformity. This is true whether the system is producing a diced product, where the squareness of the final product is the desired trait, or producing a sliced product, where uniformity of thickness, size, and shape is preferred. These systems produce a final meat product that is packaged and presented to the consumer with each piece looking generally the same as the next.

An important factor in a consumer's selection is the visual appearance of the cut food product. If put off by the uniformity normally on display by mass produced meat products, consumers may instead desire "home-style" products with an appearance similar to meat cut from a home cooked turkey or ham. Meat products that are irregular in shape and size can solve this need without requiring the consumer to spend hours preparing a home cooked meat product. However, the known cutting and slicing systems for producing slices of meat with irregular shapes and sizes do not provide a sufficient solution this problem.

When applied on a mass scale, manual cutting and slicing is simply not cost effective, requiring tedious processing and excessive manual labor. Accordingly, there have been other attempts at producing irregular shaped and sized slices. One method known in the art involves using molds to shape the meat in casing to give them an irregular shape. These molded slices of meat are then put through a traditional cutting or slicing system, which produces a product with an irregular appearing shape, but also with uniform thickness and size. Another method uses a technique of skimming the bottom of a cooked meat product to produce slices with a roughed up appearance. A final method to produce slices with an irregular shape and size involves simply taking slices from several different sticks of meat and packaging them together. However, all of these techniques still result in slices of meat that have an overall uniform appearance and/or a lack of a cost-effective technique.

Therefore, a method and apparatus is needed to mass produce high quality slices of meat of irregular shape and size in a cost effective manner. The disclosed method and apparatus produces high quality, unique slices of meat that have irregular edges, natural meat grains, and natural color variation.

DETAILED DESCRIPTION

Figure 2:
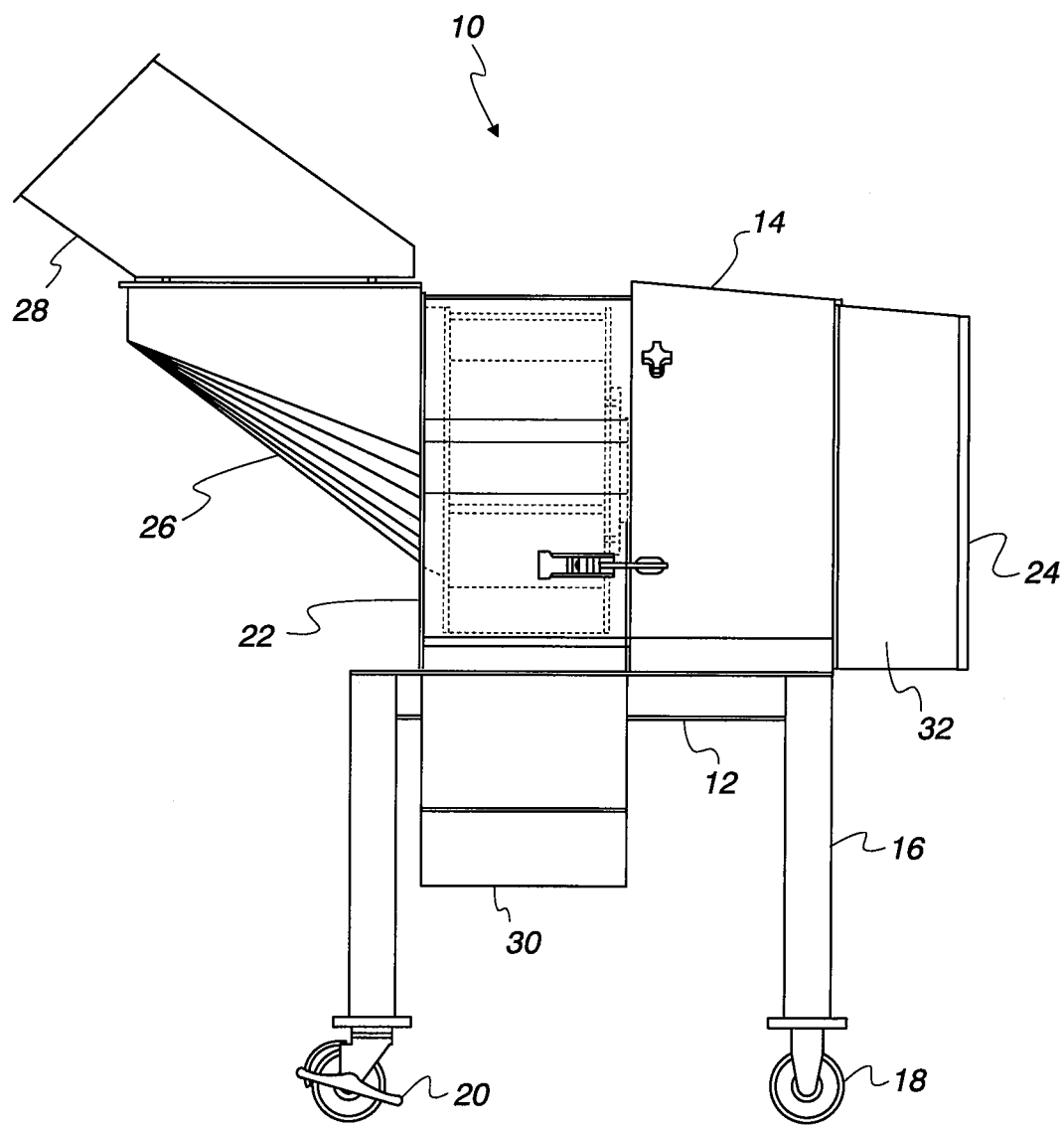
FIG. 2 is a side elevation view of an apparatus for producing meat slices of irregular shape and size.
Figure 3:
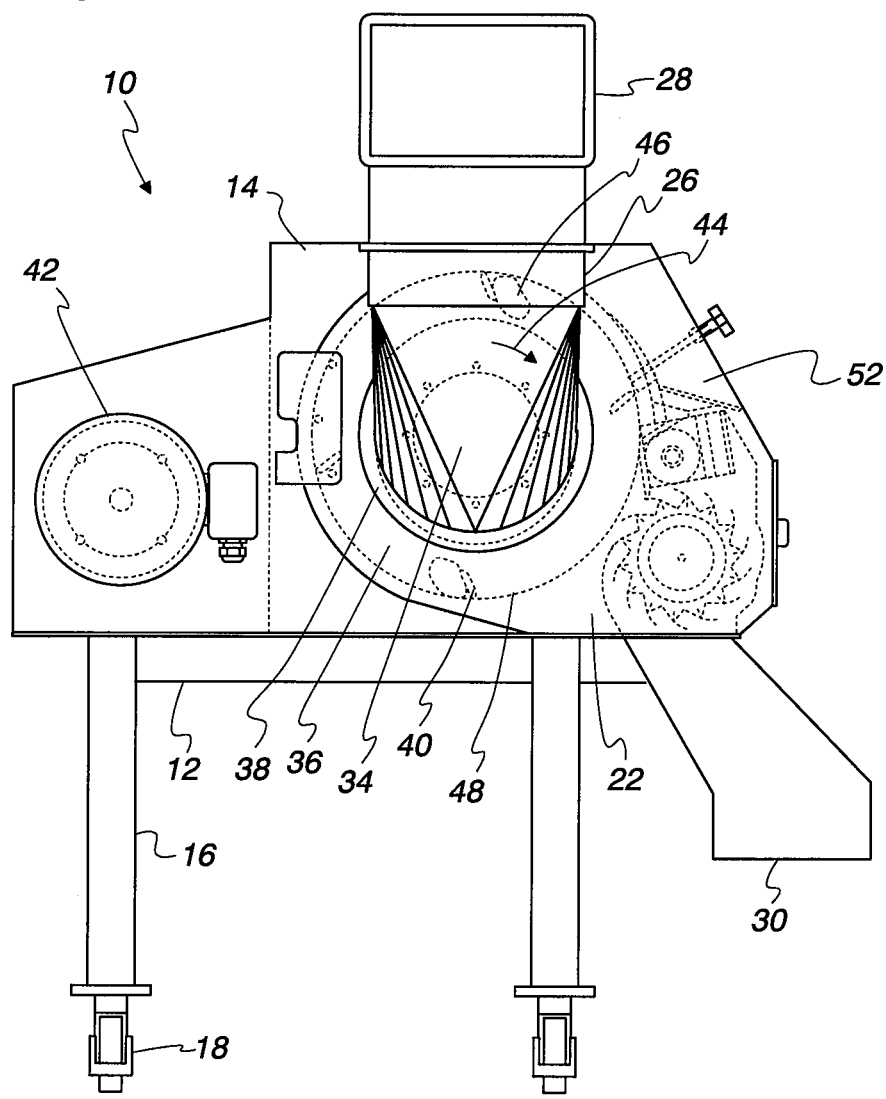
FIG. 3 is a front elevation view of an apparatus shown in FIG. 2.
Figure 4:
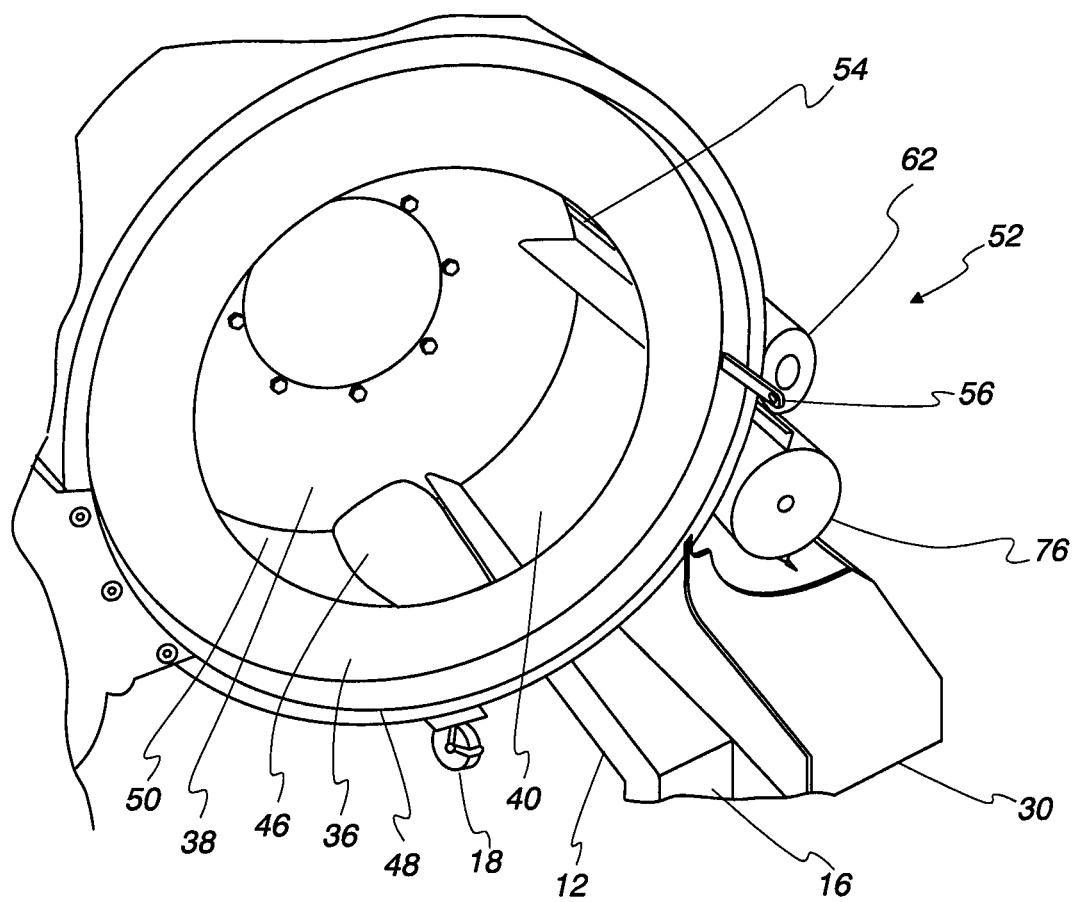
FIG. 4 is a perspective view of the apparatus of FIG. 2 with the optional front panel open.

With reference to the drawings, a method and processing machine is provided for use in producing irregularly shaped and sized food products and, in particular, for use in producing irregularly shaped and sized meat slices. The processing machine is generally referred to by reference numeral 10 in FIGS. 2-4.

With reference to FIGS. 2-5, the rotary processing machine 10 comprises a support frame 12 and a housing 14. Prepared meat products 46 are fed into a rotary impeller 34, which is rotatably attached in the housing 14. The impeller 34 comprises a plurality of equally spaced paddles 40 and is encircled by a stationary cylinder 48. A motor 42 drives the rotation of the impeller 34. As the impeller 34 rotates, the paddles 40 catch the meat product 46 and carry it along an inner surface 50 of the stationary cylinder 48. The stationary cylinder 48 includes an opening 54. On one side of the opening 54, a slicing knife 56 is attached. As the impeller 34 drives the meat product 46 around the inner surface 50 of the stationary cylinder 48, the meat product 46 approaches the opening 54 and impacts the slicing knife 56. The meat products 46 are able to tumble in the impeller so that different sides are engaged by the slicing knife 56. This process produces meat slices 46a of irregular shape and size.

The rotary processing machine 10 can further include a circular knife assembly 60. The circular knife assembly 60 is positioned proximal to the opening 54, but downstream of the slicing knife 56. The circular knife assembly 60 is oriented generally parallel with the slicing knife 56. The circular knife assembly 60 may then further reduce the size of the meat product 46, while still producing meat slices 46a of irregular shape and size. The circular knife assembly 60 would have at least one circular, rotating cutting blade 68. The blade 68 preferably is dulled to produce rough cutting edges.

The rotary processing machine 10 can further include a cross cut knife assembly 76. The cross cut knife assembly 76 is positioned proximal to and downstream of the circular knife assembly 60 and the slicing knife 56. The cross cut knife assembly 76 is oriented generally parallel with the slicing knife 56. The cross cut knife assembly 76 may then further reduce the size of the meat product 46, while still producing meat slices 46a of irregular shape and size. The cross cut knife assembly 76 would have at least one cross cut blade 78. The blade 78 preferably is dulled to produce rough cutting edges.

The rotary processing machine 10 can be made to be highly space efficient. For example, in one embodiment, the rotary processing machine 10 may have a height in the range of 50 inches to 72 inches, and preferably in the range of 54 inches to 69 inches. In addition, the rotary processing machine 10 may weigh in the range of 1,400 pounds to 1,600 pounds, and preferably about 1,500 pounds.

The frame 12 provides the support for the rotary processing machine 10. In one embodiment, the frame 12 may have a length in the range of 26 inches to 38 inches and a width in the range of 25 inches to 37 inches. In the preferred embodiment, the frame 12 has a length of about 32 inches and a width of about 31 inches. These embodiments are designed to utilize a relatively small area while still allowing the rotary processing machine 10 to operate in a high-speed commercial environment.

The small area allows the rotary processing machine 10 to seamlessly integrate with existing operations. The frame 12 may further comprise numerous legs 16. In the preferred embodiment, each of the legs 16 has casters 18 at their terminal end to allow for greater mobility of the rotary processing machine 10. At least one caster 18 preferably has a locking mechanism 20 that an operator can engage to prevent the rotary processing machine 10 from moving when movement is not desired.

The frame 12 is attached to and supports the housing 14. In one embodiment, the housing 14 may have a length in the range of 37 inches to 67 inches, and preferably in the range of 47 inches to 62 inches, and more preferably about 57 inches. The housing 14 may enclose any or all of the motor 42, the impeller 34, the stationary cylinder 48, the knife assembly 52, and an electrical component box 32. The housing 14 may also include access to the devices enclosed within it. In one embodiment, this access comprises a front panel 22. The front panel 22 may be hinged to provide the operator access to the impeller 34, the stationary cylinder 48 and the knife assembly 36. This feature provides the user with easy access to these devices as needed, for example, for maintenance or cleaning. In another embodiment, this access may include a back panel 24. The back panel 24 may be hinged to provide the operator access to at least the electrical component box 32, as needed.

The housing 14 includes a hopper 26. The hopper 26 is positioned to receive the prepared meat product 46 and feed it into the stationary cylinder 48. The hopper 26 is positioned adjacent to the stationary cylinder 48, and preferably centered with the stationary cylinder 48. In the preferred embodiment, the hopper 26 has an opening directed upwards for loading of the prepared meat product 46 and urging of the prepared meat product 46 into the stationary cylinder 48 by gravitational force. The diameter of the hopper 26 where it provides access to the stationary cylinder 48 may be in the range of 13.5 inches to 14.8 inches, and preferably about 13.5 inches. The hopper 26 may preferably be positioned on the front panel 22 to provide access to the stationary cylinder 48 and the impeller 34 as needed, for example, for maintenance or cleaning.

In the preferred embodiment, the housing 14 also comprises a feeder chute 28. The feeder chute 28 is attached to the hopper 26 to provide an extended and more covered access route for the prepared meat product to reach the stationary cylinder 48. The access opening of the feeder chute 28 may be vertically aligned or preferably facing generally upwards. In one embodiment, the feeder chute 28 is generally circular with an opening generally equal to that of the hopper 26 at its distal end where the chute 28 meets the hopper 26. Alternatively, in the preferred embodiment, the feeder chute 28 starts with a generally square opening, preferably about 13.5 inches on each side, and ends with an opening generally equal to that of the hopper 26 at its distal end where the chute 28 meets the hopper 26.

The housing 14 also may include a discharge chute 30. The discharge chute 30 is positioned below the knife assembly 52 to direct the discharge of the meat slices 46a from the rotary processing machine 10. The discharge chute 30 may be downward facing. The distal end of the discharge chute 30 may be in the range of 10 inches to 20 inches above the floor, and preferably about 15 inches. This preferable height from the floor provides the discharge chute 30 with a sufficient height to accommodate larger slices produced by the processing machine 10. It may be of a generally rectangular shape with a width equal to or larger than the width of the stationary cylinder 48, and preferably in the range of 13 inches to 15 inches, and more preferably about 13.7 inches. The length of the distal end of the discharge chute 30 may be in the range of 5 inches to 15 inches, and preferably about 10 inches. In one embodiment, the discharge chute 30 is attached to the housing 14 directly below the knife assembly 52 and angles away from the rotary processing machine 10, so that the distal end of the discharge chute 30 is spaced from the frame 12 in the range of about 4 inches to 12 inches, and preferably in the range of 8 inches to 9 inches. In addition, the discharge chute 30 preferably does not contain any obstructions in order to provide an easier discharge path for the meat slices 46a.

The impeller 34 includes a pair of rotating end discs 36, 38 interconnected by the paddles 40. The paddles 40 are equally spaced around the interior circumference of the end discs 36, 38. The impeller 34 is rotatably attached in the housing 14. The paddles 40 are preferably attached perpendicular to the end discs 36, 38. The paddles may be orientated generally radially, or alternatively, they may be angled toward the direction of rotation of the impeller 34. This angle can be between 0 and 55 degrees from radial in the direction of rotation of the impeller 34, and preferably about 30 degrees. The paddles 40 may preferably start at the outer edge of the impeller 34 or, alternatively, start in a range up to 1 inch from the edge. The paddles 40 have a length in the range of 3 inches to 6 inches, and preferably 4 to 5 inches. This preferable length allows the meat product 46 to tumble and present different oriented slicing surfaces to the slicing knife 56. In one embodiment, the impeller 34 has between two and six paddles 40, and preferably between three and five paddles 40. In the most preferred embodiment, the impeller 34 has four paddles 40.

The motor 42 drives the rotation of the impeller 34, such as in a direction indicated by the arrow 44. The motor 42 can operate at any feasible hertz level, and preferably in a range from 60 to 75 hertz, and more preferably 75 hertz. In addition, the motor 42 can operate at any feasible horsepower, and preferably at 10 horsepower. The motor 42 may preferably be supplied voltage across the line or, alternatively, by a variable frequency drive.

As the motor 42 causes the impeller 34 to rotate, the paddles 40 contact the prepared meat product 46 and cause it to rotate along with the impeller 34 in the direction of the arrow 44. As a result of the rotation, centrifugal force presses the prepared meat product 46 against the inner surface 50 of the stationary cylinder 48. The paddles 40, in turn, drive the prepared food product 46 around the inner surface 50 of the stationary cylinder 48. Because the rotary cutting machine 10 does not restrain or control the position of the prepared meat product 46 beyond the application of centrifugal force, the prepared food product 46 can tumble and fall within the impeller 34. As a result of this process, the prepared meat product 46 is pressed against the inner surface 50 of the stationary cylinder 48 in random and different orientations as it is driven by the paddles 40 of the impeller 34.

The degree of random and different orientations can be increased depending upon the amount of meat product 46 present in the impeller 34. For example, having more meat products 46 in the impeller 34 than the number of paddles 40 can advantageously result in the excess meat products 46 accumulating in a lower region of the cylinder 48. After a meat product 46 has been sliced, the meat product 46 can continue to rotated toward the lower region where the accumulated meat products 46 can cause the just-sliced meat product 46 to become dislodged from adjacent the paddle 40. Another meat product 46 can then take the place of the just-sliced meat product 46. When the just-sliced meat product 46 is subsequently advanced by the same of a different paddle 40, it can be in a different orientation than if it had continued to rotate by the same paddle 40, and thereby the next time it is sliced, a differently shaped slice can be cut.

Figure 5:
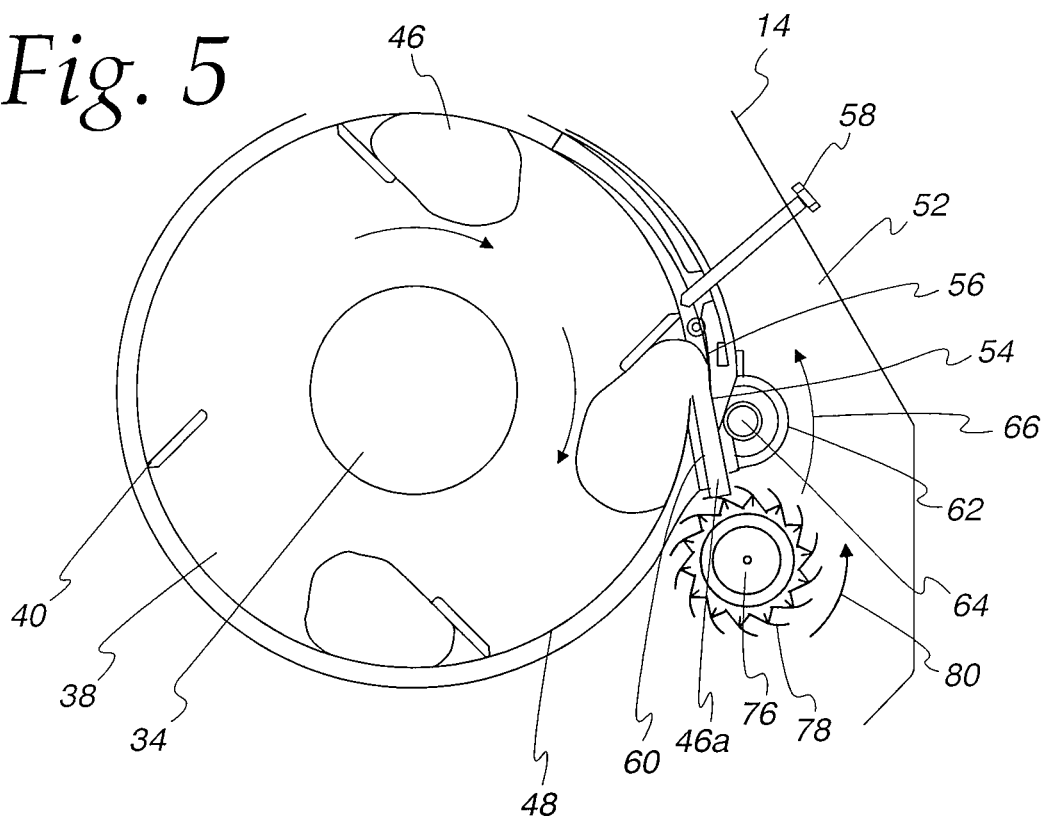
FIG. 5 is a side elevation view of the impeller and knife assembly of the apparatus of FIG. 2.

As the prepared meat product 46 is driven around the inner surface 50 of the stationary cylinder 48, it encounters the knife assembly 52, as shown in FIG. 5. The knife assembly 52 includes the opening 54 and the slicing knife 56.

The opening 54 is formed in the stationary cylinder 48 by spacing the side of the opening 54 positioned earlier in the path of rotation of the impeller 34 from the outer periphery of the impeller 34. The opening 54 can be formed anywhere on the stationary cylinder 48, and preferably is formed at a position of the stationary cylinder 48 where the rotation of the impeller 34 is in a generally downward direction and, more preferably, where the velocity of the prepared meat product 46 is generally perpendicular with the floor. The opening 54 preferably spans the width of the stationary cylinder 48 and is preferably generally horizontal. Alternatively, the opening 54 may be formed in the stationary cylinder 48 at an angle in the range of 45 degrees above or below horizontal.

In the preferred embodiment, the width of the opening 54 can be adjusted by a control knob 58. The control knob 58 is preferably adjacent to the opening 54 and attached to the side of the opening 54 spaced from the outer periphery of the impeller 34. To adjust the width of the opening 54, the control knob 58 can adjust the distance the side of the opening 54 is spaced from the outer periphery of the impeller 34. The control knob 58 can vary the width of the opening 54 in a range from 1/16 inch to 1 inch, and preferably the opening 54 is set between 1/8 inch and 3/16 inch. The width of the opening 54 set by the control knob 58 determines the maximum thickness of the meat slices 46a produced by the rotary processing machine 10.

The slicing knife 56 is positioned at the side of the opening 54 that extends along the outer periphery of the impeller 34. In the preferred embodiment, the slicing knife 56 is removably positioned at the opening 54. The removably attached slicing knife 56 may then be removed and inserted as needed, for example, to select a different type of the slicing knife 56, with a scalloped blade being preferred, to repair or maintain the slicing knife 56, or to replace the slicing knife 56. The slicing knife 56 preferably spans the length of the opening 54 and is positioned to provide the first point of contact for the meat product 46 as it is driven into the opening 54 by the impeller 34. As the paddles 40 drive the meat product 46 to the opening 54, the meat product 46 is driven beyond the outer periphery of the impeller 34 due to the spacing of the opening 54. As the paddle 40 continues to rotate, the meat product 46 is driven into the slicing knife 56 which is positioned at the outer periphery of the impeller 34, producing meat slices 46a of thickness determined by the width of the opening 54.

The slicing knife 56 may further comprise a guide surface 60. As the slicing knife 56 cuts into the prepared meat product 46, meat slices 46a are produced, and the guide surface 60 can direct the meat slices 46a away from the knife assembly 52 and towards the discharge chute 30.

Figure 6:
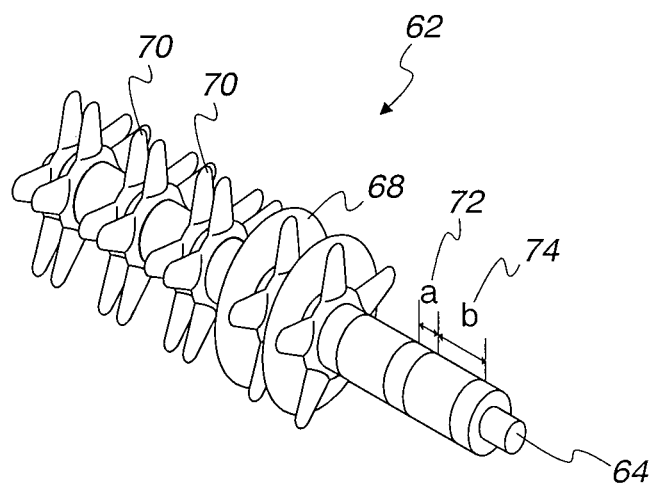
FIG. 6 is a perspective view of an optional circular knife assembly for use in the apparatus of FIG. 2.

The knife assembly 52 may further comprise the circular knife assembly 62, as shown in FIG. 6. The circular knife assembly 62 comprises at least one circular blade 68 mounted on a rotatable shaft 64 and is positioned in a direction that is generally parallel to the process feed direction. The circular knife assembly 62 is rotatably mounted to the housing 14 to preferably rotate in a direction as indicated by the arrow 66. The circular knife assembly 62 is preferably downstream and proximal to the slicing knife 56. As the meat slices 46a are produced, they may travel down the guide surface 60 of the slicing knife 56. While on the guide surface 60, the at least one circular blade 68 may then further reduce the size of the meat slices 46a.

In the preferred embodiment, the circular knife assembly 62 has dulled circular blades 68. The circular blades 68 may be artificially dulled by any method, or preferably, the circular blades 68 may be allowed to dull naturally and are not sharpened. The dulled circular blades 68 may then reduce the meat slice 46a size while still producing meat slices 46a with irregular edges consistent with the appearance of "homestyle" carved meat. The dull circular blades 68 provide a natural cut by pulling the muscle fibers of the sliced meat product 46a.

The circular knife assembly 62 may alternatively contain feed discs 70 to assist in advancing the meat slices 46a. The feed discs 70 may be mounted on the rotatable shaft 64 in place of any number of the circular blades 68.

The circular knife assembly 62 may consist of between one and fifteen circular blades 68, and preferably one circular blade 68, depending on the size of the prepared meat product 46 being used and the size of the meat slices 46a desired. The chosen number of blades 68 having different spacings therebetween to cut the meat slices 46a into further reduced sizes of varying widths. As illustrated in FIG. 5, a first spacer 72 creates a gap or space of length 'a,' and a second spacer 74 creates a gap of length 'b.' The spacers 72, 74 can be alternated every other one, such that the spacing between the blades 68 is also alternating between a space of length 'a' and 'b,' or, alternatively, may be placed in any other suitable combination. The blade 68 spacing may be varied from 1/8 inch to 1 inch. For any number of the circular blades 68 not used, the feed discs 70 may be positioned on the rotatable shaft 64 instead. Preferably, the circular knife assembly 62 is composed of two circular blades 68 spaced apart by 3 inches and centered on the rotatable shaft 64 having 3/4 inch spacers 72, 74 running the length of the rotatable shaft 64. The remaining spaces between the spacers 72, 74 on the rotatable shaft 64 preferably have feed discs 70.

The knife assembly 52 may also comprise the cross cut knife assembly 76. The cross cut knife assembly 76 is positioned in a direction that is generally parallel to the process feed direction. The cross cut knife assembly 76 can be comprised of a number of cross cut blades 78 in the range of 1 to 14, and preferably 2. The cross cut blades 78 preferably run the length of the cross cut knife assembly 76 and are positioned generally parallel to the process feed direction. The cross cut knife assembly 76 is rotatably mounted to the housing 14 to preferably rotate in a direction as indicated by the arrow 80. The cross cut knife assembly 76 is preferably downstream and proximal to the slicing knife 56. As the meat slices 46a are produced, they may travel down the guide surface 60 of the slicing knife 56. As the meat slices advance beyond the end of the guide surface 60, the cross cut blades 78 may then further reduce the size of the meat slices 46a.

In the preferred embodiment, the cross cut knife assembly 76 has dulled cross cut blades 78. The cross cut blades 78 may be artificially dulled by any method, or preferably, the cross cut blades 78 may be allowed to dull naturally and are not sharpened. The dulled cross cut blades 78 may then reduce the meat slice 46*a* size while still producing meat slices 46*a* with irregular edges consistent with the appearance of "home-style" carved meat. The dull cross cut blades 78 provide a natural cut by pulling the muscle fibers of the sliced meat product 46*a*.

Figure 1:
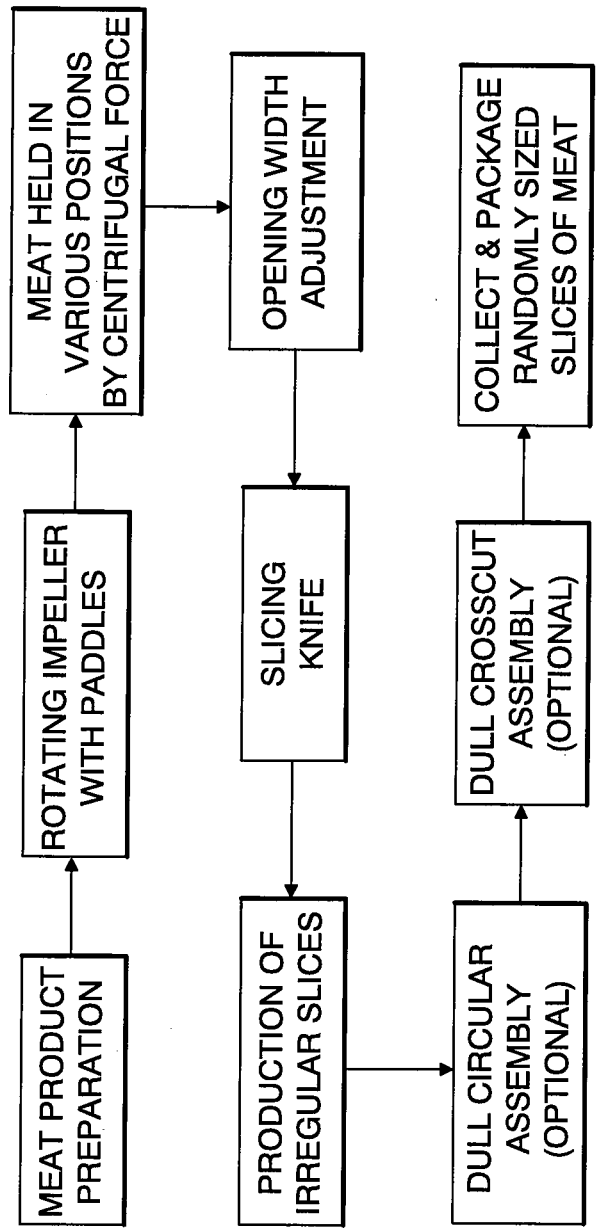
FIG. 1 is a flow diagram of a method for producing meat slices of irregular shape and size.

With reference to the diagram of FIG. 1, a bulk meat product is first selected for processing by the processing machine. The bulk meat product can be selected from any variety of meat product, including, for example, ham, turkey, chicken, or beef. Once the bulk meat product is selected, it can then be prepared for processing. This preparation can first include chilling the bulk meat product to the required temperature. This may include storing the bulk meat product at the desired temperature or instead chilling the bulk meat product further to reach the desired temperature. The meat product should be kept at a temperature below 40 degrees Fahrenheit for food safety purposes, and preferably, the meat product should have a temperature in the range of 30 to 35 degrees Fahrenheit when processed by the processing machine. Alternatively, the bulk meat product can be cooked or heated prior to processing. This may include cooking the meat product by any suitable means. This preparation can also include removing the bulk meat product from any casing or wrapping used to store and ship the product. This preparation may ensure that the meat product is free of any foreign material to keep any foreign material out of the final sliced product. Another option for preparation includes breaking down the bulk meat product prior to processing. The bulk meat product may be broken down by hand or other suitable means. However, it has been found that breaking down formulated turkey into smaller portions before processing can create a good, but small end product. In any case, the prepared meat product is preferably about 10 inches in any dimension or less. Finally, the total amount of meat product may be selected. The amount of meat product selected is dependent on the amount of output slices desired and can be in a range of one meat product to more than 20 with each load into the processing machine.

A next step can include selecting a slicing knife. The slicing knife can have any type of edge, including, for example, a scalloped or a wavy edge. Once the slicing knife is selected, it may then be inserted into the processing machine. As disclosed above, inserting the slicing knife into the processing machine positions the knife at the opening formed in the stationary cylinder.

Next, a desired slice thickness can be determined. As disclosed above, the slice thickness may be in the range of $\frac{1}{16}$ inch to 1 inch. The desired slice thickness may vary depending on the selected type of meat or the application of the desired output. Once selected, the slice thickness may then be represented on the processing machine. To alter the thickness of the slices produced by the processing machine, the width of the opening can be adjusted. The control knob is operably attached to the opening to adjust the width thereof. The slice thickness corresponds to the distance between the slicing knife and the side of the opening spaced from the outer periphery of the impeller.

The following step may include determining a desired slice width. This width may be as large as the selected bulk meat product or the broken down selected meat product, or as small as $\frac{1}{8}$ inch as disclosed in the discussion of the circular knife assembly above. The desired slice width may vary depending on the type of the selected meat product or the application of the product intended to be produced by the processing machine. Once the desired slice width is determined, it can then be determined whether a circular knife assembly is needed. If the desired slice width is less than any dimension of the prepared meat product, the circular knife assembly may be used to further reduce the width. If the circular knife assembly is required, its setup must then be determined. This includes choosing the number of pre-dulled circular blades desired and the spacing between the pre-dulled circular blades. After the desired number of blades and spacing is determined, then the type of spacers and number of feed discs can be ascertained. Once all of the circular knife assembly materials are chosen, they may be mounted on a rotatable shaft. The assembled circular knife assembly may then be rotatably attached to the housing of the processing machine proximal to and downstream of the slicing knife.

Another step may include determining a desired slice height. This height may be as large as the height of the selected bulk meat product or the broken down selected meat product, or instead, a smaller slice may be desired. If a smaller slice height is desired, a cross cut knife assembly may be used. If the cross cut knife assembly is required, its setup must then be determined. This includes choosing the number of pre-dulled cross cut blades desired and the spacing between the pre-dulled cross cut blades, and preferably two evenly spaced dulled cross cut blades. The cross cut knife assembly may then be rotatably attached to the housing of the processing machine proximal to and downstream of the slicing knife.

Next, the processing machine may be started. A desired speed of rotation of the impeller may then be determined. The speed of the rotation of impeller influences the magnitude of the centrifugal force applied on the prepared meat product while in the impeller and, similarly, it may also influence the tumbling and orientation of the meat products while in the impeller. This process determines the edge of the meat product from which the slices are produced. If a desired speed is determined, the speed of rotation of the impeller may then be set. The available speeds may vary with the type of motor operating the processing machine, and preferably the motor can operate at 75 hertz.

The processing machine comprised of a housing, a motor, an impeller, and a knife assembly may then use the impeller having at least one paddle to rotatably drive the prepared meat product around the housing, the prepared meat product held to the housing by centrifugal force, to impact the knife assembly to create irregularly shaped meat slices.

The selected and prepared meat product can then be loaded into the processing machine. The machine operates as detailed above to output mass-scale "home-style" slices of meat of irregular shape and size. As the slices of meat are output by the processing machine, they can be collected. This may be done by placing a bag or collection bin under the discharge chute. Finally, the collected slices can be packaged.

EXAMPLES

The following examples illustrate presently preferred methods and should be understood to be illustrative of, but not limiting upon, the scope of the apparatus and method which are set forth in the appended claims.

For the following tests, the processing machine had an impeller with four equally spaced paddles, a ten horsepower motor operating at sixty hertz across the line, and a scalloped slicing knife with a $\frac{3}{16}$ inch slice thickness. Two bags of bulk meat product, removed from the plastic casing, were used in the tests.

| Test | Meat | Temp. | Prep. | Result |
|---|---|---|---|---|
| 1 | Ham Loaves | 32° F. | Whole | Very Good Slices of Irregular Shape and Size |
| 2 | Ham Loaves | 35° F. | Broken into pieces by hand | Very Good Slices of Irregular Shape and Size |
| 3 | Ham Loaves | 35° F. | Whole | Very Good Slices of Irregular Shape and Size |
| 4 | Formulated Turkey | 30° F. | Whole | Very Good Slices of Irregular Shape and Size |
| 5 | Formulated Turkey | 30° F. | Broken into pieces by hand | Very Small Slices of Irregular Shape and Size |
| 6 | K Butt Tumbled Ham Loaves | 32° F. | Broken into pieces by hand | Very Good Slices of Irregular Shape and Size |
| 7 | K Butt Not Tumbled Ham Loaves | 32° F. | Broken into pieces by hand | Very Good Slices of Irregular Shape and Size |

For the following tests, the processing machine had an impeller with four equally spaced paddles, a ten horsepower motor operating at sixty hertz across the line, a scalloped insert knife with a 3/16 inch slice thickness, and a circular knife assembly. The circular knife assembly had one circular blade at 5¼ inches and feed discs positioned at the remaining spaces between the ¾ inch spacers. Two bags of bulk meat product, removed from the plastic casing, were used in the tests.

| Test | Meat | Temp. | Prep. | Result |
|---|---|---|---|---|
| 8 | Formulated Turkey | 38° F. | Whole | Good Slices of Irregular Shape and Size |
| 9 | Ham Loaves | 34° F. | Broken into pieces by hand | Very Good Slices of Irregular Shape and Size |

For the final test, the processing machine had an impeller with four equally spaced paddles, a ten horsepower motor operating at seventy five hertz across the line, a scalloped insert knife with a ⅛ inch slice thickness, and a circular knife assembly. The circular knife assembly had one circular blade at 5¼ inches and feed discs positioned at the remaining spaces between the ¾ inch spacers. Two bags of bulk meat product, removed from the plastic casing, were used in the test.

| Test | Meat | Temp. | Prep. | Result |
|---|---|---|---|---|
| 10 | Ham Loaves | 34° F. | Whole | Very Good Slices of Irregular Shape and Size |

For the following tests, the processing machine had an impeller with four equally spaced paddles, a ten horsepower motor operating at 75 hertz across the line, a scalloped slicing knife with a 3/16 inch slice thickness, and a circular knife assembly. The circular knife assembly had two dulled circular blades one 3 inches from either end of the rotatable shaft and feed discs positioned at the remaining spaces between the ¾ inch spacers. Four pieces of bulk meat product were used in the tests.

| Test | Meat | Temp. | Prep. | Result |
|---|---|---|---|---|
| 11 | Chicken - Slit casing | 31° F. | Whole, drained juices | Very Good Slices of Irregular Shape and Size |
| 12 | Chicken | 31° F. | Whole, drained juices | Very Good Slices of Irregular Shape and Size |
| 13 | Turkey - Slit casing | 31° F. | Whole, drained juices | Very Good Slices of Irregular Shape and Size |
| 14 | Turkey | 31° F. | Whole, drained juices | Very Good Slices of Irregular Shape and Size |
| 15 | Ham - Split Top | 31° F. | Whole, drained juices | Very Good Slices of Irregular Shape and Size |
| 16 | Ham | 31° F. | Whole, drained juices | Very Good Slices of Irregular Shape and Size |
| 17 | Beef - Split Top | 31° F. | Whole, drained juices | Very Good Slices of Irregular Shape and Size |
| 18 | Turkey Breasts Halved | 31° F. | Halved, drained juices | Very Good Slices of Irregular Shape and Size |
| 19 | Chicken Breasts | 31° F. | In 12 pieces, drained juices | Very Good Slices of Irregular Shape and Size |

For the following tests, the processing machine had an impeller with four equally spaced paddles, a ten horsepower motor operating at 75 hertz across the line, a scalloped slicing knife with a ½ inch slice thickness, a circular knife assembly, and a cross cut knife assembly. The circular knife assembly had dulled circular blades at every 1½ inches and feed discs positioned at the remaining spaces between the ¾ inch spacers. Four pieces of bulk meat product were used in the tests.

| Test | Meat | Temp. | Prep. | Result |
|---|---|---|---|---|
| 20 | Beef | 97° F. | Whole, drained juices | Chunk style shreds |
| 21 | Ham | 125° F. | Whole, drained juices | Chunk style shreds |
| 22 | Ham | 120° F. | Whole, drained juices | Chunk style shreds |
| 23 | Beef | 135° F. | Whole, drained juices | Chunk style shreds |

For the following tests, the processing machine had an impeller with four equally spaced paddles, a ten horsepower motor operating at 75 hertz across the line, a scalloped slicing knife with a 3/16 inch slice thickness, a circular knife assembly, and a cross cut knife assembly. The circular knife assembly had dulled circular blades spaced 3¾ inches from each end of the rotatable shaft and feed discs positioned at the remaining spaces between the ¾ inch spacers. The cross cut knife assembly had two dulled cross cut blades positioned on opposite sides of the assembly. Two pieces of bulk meat product were used in the tests.

| Test | Meat | Temp. | Prep. | Result |
|---|---|---|---|---|
| 24 | Ham | 33° F. | Whole, drained juices | Very Good Slices of Irregular Shape and Size |
| 25 | Ham | 33° F. | Whole, drained juices | Very Good Slices of Irregular Shape and Size |
| 26 | Ham | 33° F. | Whole, drained juices | Very Good Slices of Irregular Shape and Size |
| 27 | Ham | 33° F. | Whole, drained juices | Very Good Slices of Irregular Shape and Size |
| 28 | Turkey | 33° F. | Whole, drained juices | Very Good Slices of Irregular Shape and Size |
| 29 | Turkey | 33° F. | Whole, drained juices | Very Good Slices of Irregular Shape and Size |

For the foregoing, it will be appreciated that apparatus and methods are described herein for manufacturing irregularly shaped and sized food products. While the figures and description herein are illustrative of certain aspects of methods and apparatus for manufacturing irregularly shaped and sized food products, the apparatus and methods are not limited to the aspects illustrated in the figures and described hereinabove. For example, while the description generally refers to meat as the product being produced in irregular shapes and sizes, it is understood that a process according to the present description may be used for other suitable products.

It will be appreciated by those skilled in the art that modifications to the foregoing preferred embodiments may be made in various aspects. The present invention is set forth with particularity in any appended claims. It is deemed that the spirit and scope of that invention encompasses such modifications and alterations to the preferred embodiment as would be apparent to one of ordinary skill in the art and familiar with the teachings of the present application.

The invention claimed is:

1. A method of creating randomly sized slices of meat from a plurality of meat products, the method including:
   rotating a plurality of meat products using an impeller having a plurality of inwardly extending paddles, the plurality of meat products exceeding the plurality of paddles;
   directing one of the meat products toward a slicing blade during rotation of the impeller by lodging the one of the meat products against one of the paddles and against the impeller using centrifugal force from the rotation of the impeller;
   urging the one of the meat products against the slicing blade using the one of the paddles to cut a slice of meat from the one of the meat products; and
   dislodging the one of the meat products from against the one of the paddles using others of the plurality of meat products, so that the one of the meat products has a different orientation with a subsequent urging against the slicing blade for creating randomly sized slices of non-uniform meat product.

2. The method of claim 1, further including the step of cutting the slice of meat after the step of urging the one of the meat products against the slicing blade using the one of the paddles to cut the slice of meat to reduce the width of the slice of meat and form smaller width slices of meat.

3. The method of claim 2, wherein the step of cutting the slice of meat further includes using one or more rotating blades to cut the slice of meat.

4. The method of claim 3, wherein at least one of the one or more rotating blades is dulled.

5. The method of claim 4, further including the step of packaging the smaller width slices of meat.

6. The method of claim 1, further including the step of lodging a different meat product than the one meat product against the one of the paddles following the step of dislodging the one of the meat products from against the one of the paddles using others of the plurality of meat products.

7. The method of claim 1, wherein the subsequent urging of the one of the meat products against the slicing blade is performed with a different one of the plurality of paddles.

* * * * *